Figure 1:
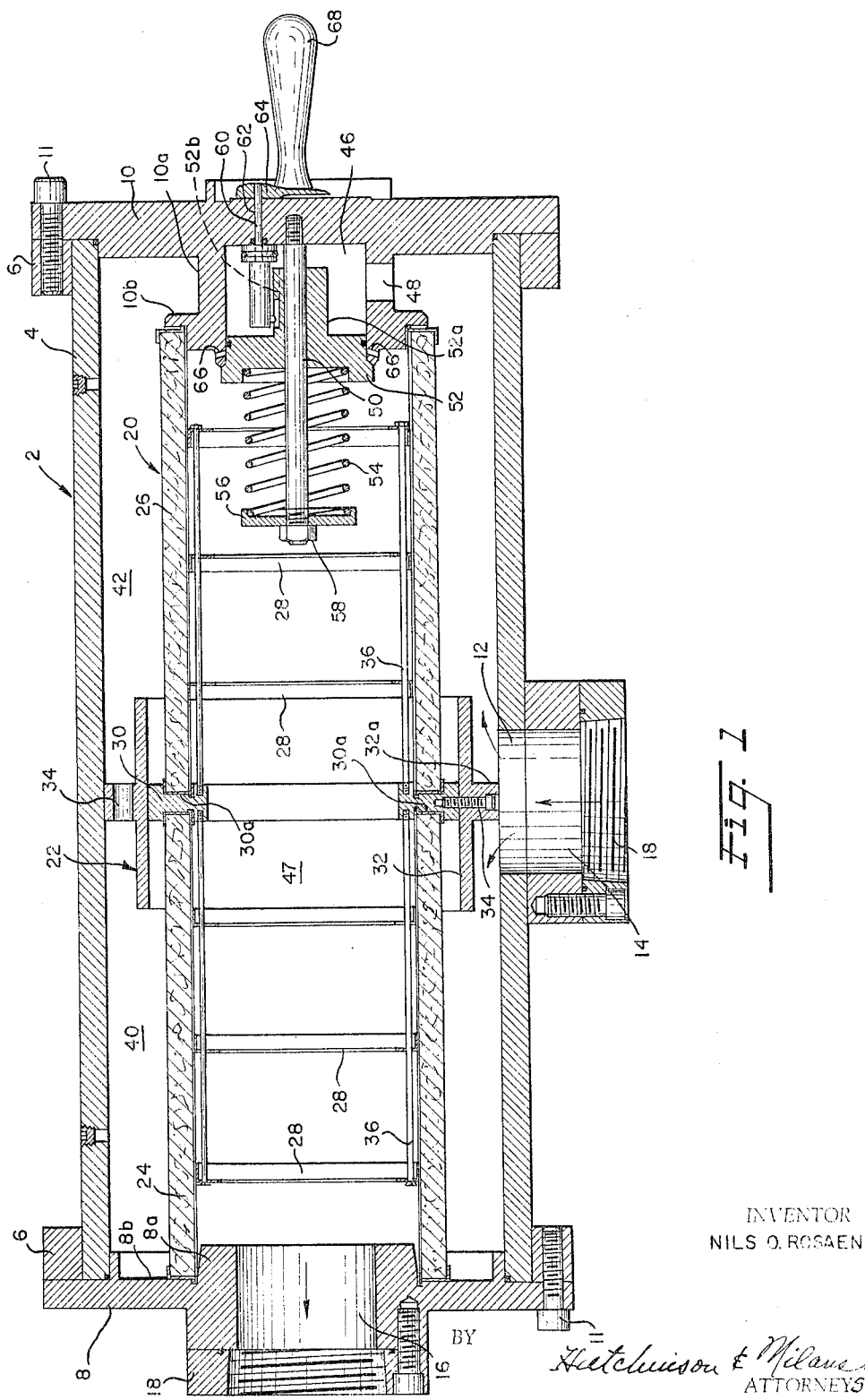

Dec. 13, 1966 N. O. ROSAEN 3,291,307
REMOVABLE TUBULAR FILTER AND BAFFLE CONSTRUCTION
Filed Sept. 24, 1963 3 Sheets-Sheet 1

INVENTOR
NILS O. ROSAEN
BY Hutchinson & Milans
ATTORNEYS

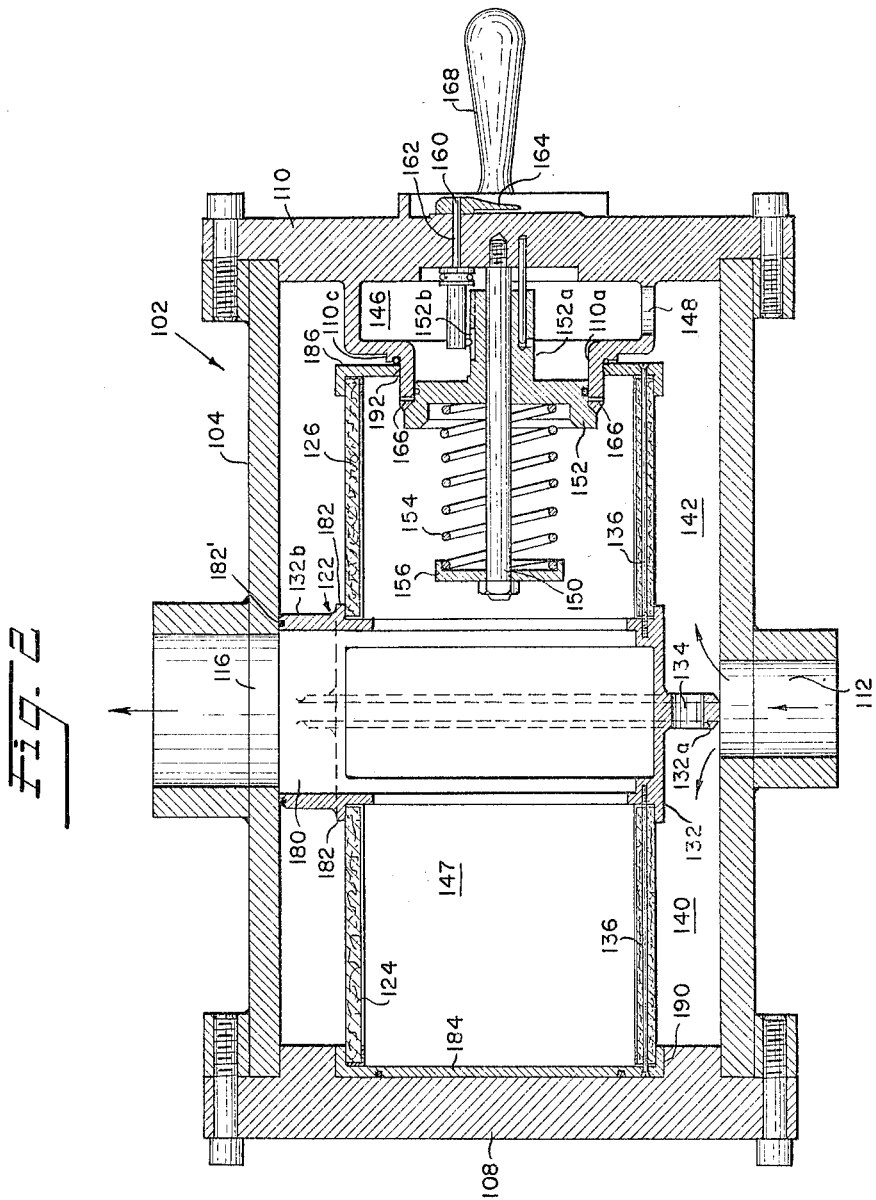

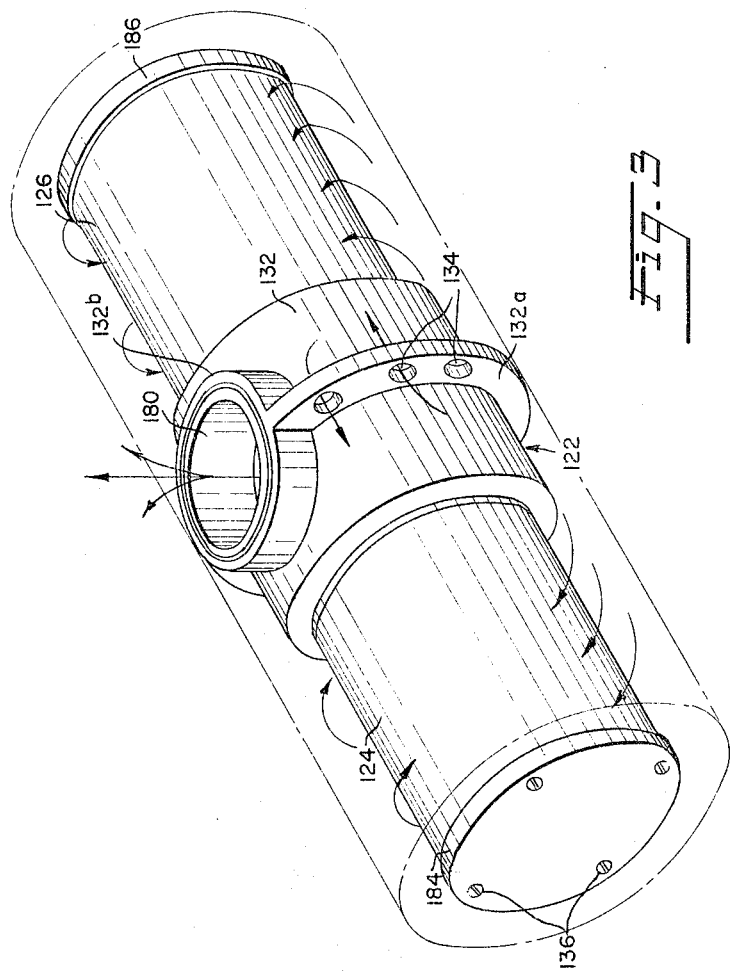

United States Patent Office 3,291,307
Patented Dec. 13, 1966

3,291,307
REMOVABLE TUBULAR FILTER AND BAFFLE CONSTRUCTION
Nils O. Rosaen, Bloomfield Hills, Mich., assignor to The Rosaen Filter Company, Hazel Park, Mich., a corporation of Michigan
Filed Sept. 24, 1963, Ser. No. 311,164
8 Claims. (Cl. 210—90)

This invention relates generally to a fluid filtering apparatus, and more particularly to a high capacity filtering apparatus including a removable filter cartridge having baffle means for protecting the filter against damage by high velocity particles entrained in the fluid and for diverting the fluid in such a manner as to obtain uniform flow through the filter elements.

In high-pressure high-capacity filter systems for fluids such as oil, the filter elements tend to become clogged by impurities during operation, and consequently it has proven desirable to make use of replaceable filter cartridge units. For the sake of economy, disposable filter elements of a lightweight inexpensive material (for example, porous paper, fibrous material and the like) have been commonly used in the art. This type of filter element has the drawback that in high capacity hydraulic systems (on the order of 150 gallons per minute), foreign particles entrained in the fluid have such a high velocity that direct impingement of the particles upon the filter elements causes damage and sometimes piercing of the lightweight elements. The portion of a filter element most susceptible to damage is the area immediately opposite the housing inlet where the incoming particles have the greatest destructive force.

A primary object of the present invention is to provide a filter apparatus including a removable filter cartridge having integral therewith a baffle means for protecting against damage that portion of the filter element which is directly opposite the housing inlet, and for diverting the fluid to obtain uniform fluid flow through the elements. In accordance with the present invention, the filter cartridge is of generally tubular construction and is mounted in the housing cavity to define annular outer and cylindrical inner chambers in communication solely with the housing inlet and outlet openings, respectively. The inlet opening is contained in the housing opposite a point intermediate the ends of the cartridge, and consequently the baffle means are mounted intermediate the ends of the cartridge opposite the inlet. In the preferred form of the invention, the cartridge comprises a pair of colinearly arranged, axially spaced tubular filter elements separably connected with opposite ends of a generally tubular baffle member.

In accordance with another object of the invention, the housing contains a cylindrical cavity and the tubular baffle member has an outer diameter that corresponds with the cavity diameter, whereby the baffle supports an intermediate portion of the filter cartridge opposite the inlet. The baffle carries on its outer periphery a diverting flange that has a longitudinal dimension less than the corresponding dimension of the inlet opening, whereby fluid is diverted by the flange toward opposite ends of the annular outer chamber. The diverting flange is carried by a sleeve portion of the baffle which contains the adjacent ends of the filter elements and which extends longitudinally a distance greater than the corresponding inlet dimension, whereby the end portions of the filter elements are protected against damage by high velocity foreign particles in the fluid.

In one embodiment, the outlet is contained in a portion of the filter housing that defines an end wall of the cylindrical housing cavity. In this embodiment the outlet communicates directly with the cylindrical chamber within the tubular filter cartridge. In another embodiment the outlet is contained directly opposite the inlet. In this embodiment communication between the outlet and the cylindrical inner chamber is afforded by a radial passage in the baffle means. At one end this passage is contained in a radially extending cylindrical portion of the baffle means which surrounds the outlet opening to isolate the outlet from the annular outer chamber. In both embodiments the housing preferably includes a tubular body portion which, for the sake of economy, is formed from machined tubing.

According to a further object of the invention, the filter cartridge is supported in the housing cavity intermediate its ends by the baffle means, and the opposite end portions of filter elements are supported by cylindrical internal portions of the housing end wall surfaces. For removal of the filter cartridge, at least one end portion of the housing is separable from the tubular body portion. In accordance with a further object of the invention, one end of the filter cartridge is supported by a cylindrical portion of pressure responsive piston motor means which are automatically operable to afford by-passing of the fluid when the filter elements become clogged, and which provide a visible indication externally of the housing of the state of cleanliness of the elements. Preferably these piston motor means are carried by a separable end portion of the filter housing.

Other objects and advantages of the invention will become apparent from a study of the following specification when considered in conjunction with the accompanying drawing, in which:

FIG. 1 is a longitudinal sectional view of a first embodiment of the invention;
FIG. 2 is a sectional view of a second embodiment; and
FIG. 3 is a perspective view of the filter cartridge of the FIG. 2 embodiment.

Referring first to FIG. 1, the filter assembly includes a housing 2 comprising a tubular body member 4 upon the opposite ends of which are secured concentric end rings 6. End plates 8 and 10 are removably connected with the tubular member 4 and rings 6 by bolts 11. For the sake of economy, wall member 4 is preferably formed from machined tubing. However, if desired, the wall member and the end rings may be a unitary structure produced, for example, by casting. Intermediate its ends the wall member 4 contains a circular radially extending through bore that defines an inlet 12 about which is rigidly secured a collar 14. Preferably, inlet 12 is midway between the ends of the tubular wall member. End plate 8 contains at its center an outlet 16. Internally threaded female fittings 18 are bolted to the housing opposite the inlet and outlet openings as shown.

Removably mounted in the housing is a generally tubular filter cartridge assembly 20 that includes a central annular baffle member 22 arranged colinearly intermediate a pair of tubular filter elements 24 and 26. Each filter element is formed of a lightweight material (for example, porous corrugated paper) and is provided with a plurality of rigid internal bracing rings 28. In the illustrated embodiment, baffle member 22 is sectional and includes a transverse internal ring 30 which is connected with sleeve element 32 by a radially extending bolt 34. Ring 30 is provided on opposite sides with annular recesses 30a that receive the corresponding ends of filter elements 24 and 26. Bolts 36 extend longitudinally through the bracing rings of each filter element and are threadably connected at their adjacent ends with the baffle ring 30, thereby connecting the filter elements with the baffle member to define a rigid cartridge unit. Centrally located on the outer periphery of baffle sleeve 32 is an annular diverting flange 32a the outer diameter of which corresponds with the internal diameter of body member 4. Diverting flange 32a contains a plurality of circumferentially arranged, longitudinally extending passages 34. While baffle member 22 has been illustrated and described as including separable ring and sleeve elements 30 and 32, it is apparent that, if desired, the member could be of unitary construction. Preferably the baffle member is formed of a durable metal, such as aluminum.

At its free end, filter element 24 is concentrically mounted upon tubular extension 8a of end plate 8. The end surface of filter 24 abuts the adjacent transverse internal wall surface 8b of end plate 8. Similarly, the free end of filter element 26 is concentrically mounted upon tubular extension 10a of end plate 10 and abuts the shoulder of annular flange portion 10b.

It is important to note that when the filter cartridge 20 is mounted in the housing as shown in FIG. 1, the diverting flange 32a is centrally located opposite inlet 18. The thickness of the diverting flange is considerably less than the diameter of inlet opening 12. Moreover, the sleeve 32 extends at each end from flange 32a a distance greater than the radius of inlet opening 18. The diverting flange defines in housing 2 about filter elements 24 and 26 a pair of outer annular chambers 40 and 42, respectively, which are interconnected via the flange passages 34 and are in direct communication with inlet 12. A cylindrical inner chamber 47 is defined within the tubular filter cartridge.

In accordance with the invention, the filter device includes piston motor means for by-passing fluid around the filter in the event that it becomes clogged during use, and for presenting, externally of the housing, a visible indication of the state of porosity (i.e., the cleanliness) of the filter elements. To this end tubular extension 10a defines a cylinder chamber 46 that is in communication with housing chamber 42 via passage 48. Rod 50 is threadably connected at one end with end plate 10 and extends coaxially through tubular extension 10a. Slidably mounted within cylinder chamber 46 upon rod 50 is a piston 52. Compression spring 54 is mounted about rod 50 intermediate piston 52 and a spring retainer 56. Nut 58, which is threadably mounted upon the free end of rod 50, prevents left hand movement of retainer 58 on rod 50, and consequently piston 52 is biased by spring 54 to the right toward its illustrated position.

Piston 52 includes a cylindrical extension 52a the outer periphery of which contains a curved, generally axially extending cam recess 52b. Riding within this recess is a follower member that is secured to an indicating shaft 60 which is rotatably mounted within and extends through opening 62 in end plate 10. Indicator pointer 64 is secured to the external end portion of shaft 60. Cam recess 52b has a configuration that causes rotation of shaft 60 upon linear movement of piston 52. Tubular extension 10a contains by-pass passages 66 that are closed by piston 52 when the piston is in the illustrated position. Handle 68 is secured to the outer surface of end plate 10.

*Operation*

The operation of the FIG. 1 embodiment is as follows:

Assuming that the filtering device is in the illustrated assembled condition and that high pressure, high velocity oil enters the filter housing via inlet 12, the oil impinges against the adjacent surface of baffle member 22 and is diverted, in substantially equal quantities, by diverting flange 32a into annular chambers 40 and 42. Passages 34 effect equalization of the fluid pressures in annular chambers 40 and 42, and the oil in these chambers passes radially inwardly through filter elements 24 and 26, respectively, into central chamber 47. The filtered oil is emitted from the housing via outlet 16.

Assume now that during continued use the filter elements become clogged by foreign particles and impurities removed from the oil. Owing to the reduction in the porosity of the filters, the flow of fluid into central chamber 47 is restricted and consequently the pressure in chambers 40, 42 and 46 exceeds the pressure of chamber 47. Owing to this pressure differential, piston 52 is displaced to the left against the opposing force of spring 54. Owing to the configuration of cam recess 52b, this left-hand movement of the piston effects rotation of shaft 60 and pointer 64, thus providing a visible indication that the filters have become partially clogged.

In the event that the filters become further clogged, the pressure differential between chambers 46 and 47 causes further movement of piston 52 to the left (and accompanying further rotation of shaft 60 and pointer 64) until by-pass passages 66 are opened, whereupon the fluid in chambers 40 and 42 by-passes the filters and flows directly into inner chamber 47 via passage 48, chamber 46 and passages 66. Pointer 64 indicates that the filter device is in a by-passing condition and that replacement of the filter elements is necessary.

To replace the filter elements, end plate 10 is unbolted and is removed, by means of handle 68, from tubular wall element 4. Since the piston-motor indicating and by-pass means (including piston 52, rod 50, spring 54 and retainer 56) are carried by end plate 10, the free end of filter cartridge 20 is exposed and the cartridge may be readily withdrawn from the tubular wall member 4. Upon release of fastening bolts 36, the filter elements are separated from baffle member 22. The ends of a clean pair of filters are inserted into annular recesses 30a, and the filters are rigidly connected with the baffle member by bolts 36. The clean filter cartridge is then inserted within tubular member 4, and end plate 10 is again bolted in place. It should be noted that replacement of the filter cartridge is achieved without disconnection of the hydraulic system conduits from inlet 12 and outlet 16.

When in the assembled condition, filter cartridge 20 is firmly supported at one end by end plate 8 and tubular extension 8a, and at the other end by tubular extension 10a and shoulder 10b. At its center, the cartridge is supported by the cooperation between flange 32a of baffle member 22 and the internal circumference of tubular member 4. An important feature of the invention resides in the protection afforded the adjacent ends of the filter elements opposite inlet 12 by sleeve 32 of the baffle member 22. Since the length of sleeve 32 is greater than the diameter of circular inlet opening 12, and since the adjacent ends of filter elements 24 and 26 extend within the sleeve for mounting within recesses 30a, foreign particles in the high-velocity (on the order of 15 feet per second), high-pressure oil which enter the housing via inlet 12 will strike the aluminum baffle sleeve 32 and will be harmlessly diverted into chambers 40 and 42. Since the filter elements are protected against direct impingement by foreign particles, the elements may be formed of inexpensive filtering material, such as porous paper or the like. Moreover, the manner in which the filter cartridge is supported in the housing and the construction of the baffle member permits the application of the filter device to high capacity installations (on the order of 150 gallons per minute). Since the by-pass and indicating means are carried by the end plate 10, assembly and disassembly of the device is achieved in a simple, rapid manner.

While the by-pass passages 66 have been illustrated as being contained in the tubular extension 10a, it is apparent that in the alternative, by-pass grooves or passages might be formed in the piston 52. For example, in the U.S. Patent to O. E. Rosaen, No. 3,080,058, of March 5, 1963, the right hand extremity of the piston is stepped or reduced to provide by-pass clearance. Similarly, instead of using two filter elements, it is possible, with appropriate modification, to mount the tubular baffle element upon a single tubular filter that extends the length of the housing cavity.

Referring now to the embodiment of FIGS. 2 and 3, the housing 102 includes a tubular wall member 104 to the ends of which are bolted end plates 108 and 110. As distinguished from the FIG. 1 embodiment, end plate 108 is imperforate and outlet 116 is contained in tubular body member 4 diametrically opposite inlet 112. As in the FIG. 1 embodiment, for the sake of economy wall member 104 is preferably formed from machined tubing. The tubular baffle member 122, which preferably consists of a casting of a metal such as aluminum, includes a sleeve portion 132 upon the central outer periphery of which is provided a diverting flange 132a containing circumferentially spaced, axially extending passages 134. The outer periphery of the diverting flange 132a corresponds with the internal diameter of tubular member 104. For the greater extent of its circumference, radial flange 132a has a thickness which is considerably less than the diameter of circular inlet opening 112. Adjacent outlet 116, however, the flange widens into a cylindrical portion 132b the axis of which is normal to the longitudinal axis of the baffle sleeve. Cylindrical portion 132b, which has an outer diameter that is greater than the diameter of outlet opening 116, contains a circular bore 180 that extends radially through the baffle and affords communication between the outlet and the internal cylindrical chamber 147.

At each end, baffle member 122 is provided with annular shoulders 182 which receive the adjacent ends of tubular filter elements 124 and 126. Flanged support disks 184 and 186 are mounted upon the free ends of filter elements 124 and 126, respectively. Bolts 136 extend through the disks and the filter elements and are threadably connected at their adjacent ends with baffle member 122 thus connecting the elements to define the rigid tubular filter cartridge illustrated in FIG. 3.

This filter cartride is mounted within housing 102 as shown in FIG. 2. At one end, disk 184 and filter element 124 are supported within a cylindrical recess 190 in end plate 108. At the other end, disk 186 contains a central opening 192 by means of which the disk is mounted on tubular extension 110a of end plate 110. The outer surface of disk 186 abuts the adjacent parallel surface 110c of extension 110a. In a manner similar to that of the FIG. 1 embodiment, tubular extension 110a of end plate 110 defines the cylinder of piston-motor- by-pass and filter condition indicating means. Thus piston 152, rod 150, spring 154, retainer 156, shaft 160 and pointer 164 are carried as a unit by end plate 110. Bolts 136 rigidly connect disk 186 and filter element 126 with baffle member 122.

It is important to note that in the assembled condition of FIG. 2, the central portion of the filter cartridge is supported by the cooperation of flange 132a with the internal circumference of tubular wall member 104. Diverting flange 132a is opposite inlet 112 for diverting equal quantities of incoming fluid into annular chambers 140 and 142. Cylindrical portion 132b is concentrically arranged about outlet 116, whereby the outlet communicates directly with the internal chamber 147 of the filter cartridge via bore 180. Normally, the outer surface of tubular portion 132b is in sealing engagement with the inner periphery of tubular member 104 to isolate the outlet from annular chambers 140 and 142. However, if desired, additional sealing may be achieved by mounting O-ring 182' in a corresponding annular recess in the annular end surface of cylindrical portion 132b.

In operation, high velocity oil supplied to the housing cavity via inlet 112 is diverted equally into chambers 140 and 142 by diverter flange 132a. The high velocity oil strikes the sleeve portion 132 of baffle 122, and consequently the adjacent ends of filter elements 124 and 126 are protected against impact and damage by any foreign particles which might be present in the oil. Fluid normally flows from chambers 140 and 142 radially inwardly through filters 124 and 126, respectively, and into chamber 147. The filtered fluid in this chamber is emitted from the housing via bore 180 and outlet 116.

Owing to the connecting passages 134 and 148, chambers 140, 142 and 146 are at equal pressure. In the event that the filter elements become partially clogged during use, the differential in pressure between chambers 146 and 147 causes piston 152 to be shifted to the left to rotate shaft 160 and pointer 164 to a position indicating that the filter needs cleaning. Further clogging of the filters causes piston 152 to be shifted to a by-pass position in which chamber 146 communicates directly with chamber 147 via bypass passages 166. This further movement of the piston is accompanied by a corresponding rotation of pointer 164 to a position indicating that the filter device is in a by-passing condition.

To disassemble the filter assembly, end plate 110 is unbolted and is removed (together with the by-passing and indicating means carried thereby). The filter cartridge 120 is axially withdrawn from the housing, the filter elements are replaced, and the housing is cleaned. Following insertion of the clean cartridge within the housing cavity, end plate 110 is again bolted in place. If desired, end plate 108 may be removed during cleaning of the filter housing. It is to be noted that, as in the FIG. 1 embodiment, disconnection of the conduits from the inlet and outlet openings is not required for servicing of the filter cartridge. Since the inlet and outlet openings of the FIG. 2 embodiment are colinearly arranged, the filter has a high capacity and may be easily connected in a linear conduit portion of the hydraulic system.

While in accordance with the provisions of the Patent Statutes I have illustrated and described the preferred forms and embodiments of the invention, it will be apparent to those skilled in the art that changes may be made in the apparatus described without deviating from the invention set forth in the following claims:

1. A filtering apparatus comprising:
   (a) a sectional housing containing a generally cylindrical cavity,
   (b) said housing including a separable end member which defines an end wall of said cavity,
   (c) said housing containing also an inlet, communicating with said cavity intermediate its ends, and an outlet,
   (d) tubular filter means mounted coaxially in said cavity and radially spaced from the cylindrical wall thereof to define isolated cylindrical inner and annular outer chambers; and
   (e) generally annular baffle means coaxially mounted in said cavity opposite said inlet, the outer diameter of said baffle means corresponding with the diameter of said cavity, the longitudinal dimension of said baffle means being less than the cavity length,
   (f) said baffle means including diverter means for diverting toward each end of said outer chamber fluid entering said cavity through said inlet,
   (g) said filter means comprise a pair of tubular filter elements coaxially arranged on opposite sides of said baffle means,
   (h) means connecting said baffle means and said filter elements to define a rigid filter cartridge, said filter cartridge being axially removable from said cavity upon separation of said separable end member, and
   (i) said baffle means comprising a tubular sleeve portion coaxially arranged relative to and spaced from the cylindrical wall of said cavity, and a generally annular diverter flange extending radially outwardly from said sleeve portion intermediate the ends thereof, said flange having an outer diameter that corresponds with the cavity diameter, at least a portion of said diverter flange being directly opposite the center of said inlet, said flange and sleeve portions having longitudinal dimensions that are less and greater, respectively, than the corresponding dimension of said inlet.

2. Apparatus as defined in claim 1 wherein said housing contains said outlet in one end wall of said cavity, wherein said sleeve portion has a greater internal diameter than the outer diameter of each of said tubular filter elements, and wherein said baffle means further includes an internal ring portion on the inner circumference of said sleeve portion and spaced from the ends thereof, the adjacent ends of said filter elements extending within said sleeve portion in contiguous engagement with said internal ring portion.

3. Apparatus as defined in claim 2 wherein said diverter flange has thoughout its length a uniform longitudinal dimension, said flange containing longitudinally extending passages, whereby the portions of said annular outer chamber on opposite sides of said flange are in continuous communication.

4. Apparatus as defined in claim 1 wherein said housing contains said outlet in a cylindrical wall portion thereof diametrically opposite said inlet, and further wherein said diverting flange includes an enlarged cylindrical portion directly opposite said outlet, the outer diameter of said enlarged portion being greater than the corresponding dimensions of said outlet to isolate said outlet from said annular outer chamber, said baffle means containing a radial passage extending through said enlarged section and said sleeve portion for connecting said outlet with said inner chamber, said apparatus further including means adjacent the free ends of said filter elements for isolating said inner and outer chambers.

5. Apparatus as defined in claim 4 wherein said isolating means includes an imperforate end disk connected with one of said tubular filter elements for closing the free end thereof.

6. Apparatus as defined in claim 1, and further including pressure-responsive piston-motor means carried by the separable housing end member and operable upon clogging of said filter means to directly connect said outer and inner chambers and thereby to by-pass said filter means, said piston-motor means including a cylindrical portion for supporting one end of one of said filter elements.

7. Apparatus as defined in claim 6 wherein said pressure-responsive piston motor means includes indicating means presenting a visible indication externally of the housing of the filtering condition of said filter means.

8. A filtering apparatus comprising:
(a) a sectional housing containing a generally cylindrical cavity,
(b) said housing including a separable end member which defines an end wall of said cavity,
(c) said housing containing also an inlet communicating with said cavity intermediate its ends, and an outlet,
(d) tubular filter means mounted coaxially in said cavity and radially spaced from the cylindrical wall thereof to define isolated cylindrical inner and annular outer chambers,
(e) generally annular baffle means coaxially mounted in said cavity opposite said inlet, the outer diameter of said baffle means corresponding with the diameter of said cavity, the longitudinal dimension of said baffle being less than the cavity length,
(f) said baffle means including diverter means for diverting to each end of said outer chamber fluid entering said cavity through said inlet,
(g) means connecting said baffle means and said tubular filter means to define a rigid filter cartridge, said filter cartridge being axially removable from said cavity upon separation of said separable end member, and
(h) said baffle means comprising a tubular sleeve portion coaxially arranged relative to and spaced from the cylindrical wall of said cavity, and a generally annular diverter flange extending radially outwardly from said sleeve portion intermediate the ends thereof, said flange having an outer diameter that corresponds with the cavity diameter, at least a portion of said diverter flange being directly opposite the center of said inlet, said flange and sleeve portions having longitudinal dimensions that are less and greater respectively than the corresponding dimensions of said inlet.

References Cited by the Examiner
UNITED STATES PATENTS

| 2,360,020 | 10/1944 | Skinner et al. | 210—456 X |
| 2,870,914 | 1/1959 | Bloch | 210—456 X |
| 3,080,058 | 3/1963 | Rosaen | 210—90 |
| 3,216,571 | 11/1965 | Whiting et al. | 210—132 X |
| 3,224,587 | 12/1965 | Schmidt | 210—456 X |

SAMIH N. ZAHARNA, *Examiner.*

REUBEN FRIEDMAN, *Primary Examiner.*